US009874906B1

(12) United States Patent
Hsu

(10) Patent No.: US 9,874,906 B1
(45) Date of Patent: Jan. 23, 2018

(54) BENDABLE DISPLAY APPARATUS AND SUPPORTING DEVICE

(71) Applicant: FIRST DOME CORPORATION, New Taipei (TW)

(72) Inventor: An-Szu Hsu, New Taipei (TW)

(73) Assignee: FIRST DOME CORPORATION, New Taipei (TW)

( * ) Notice: Subject to any disclaimer, the term of this patent is extended or adjusted under 35 U.S.C. 154(b) by 0 days.

(21) Appl. No.: 15/374,846

(22) Filed: Dec. 9, 2016

(51) Int. Cl.
*G06F 1/16* (2006.01)

(52) U.S. Cl.
CPC .......... *G06F 1/1681* (2013.01); *G06F 1/1652* (2013.01); *Y10T 16/5474* (2015.01)

(58) Field of Classification Search
CPC ....... E05D 11/1028; E05D 3/06; E05D 3/122; E05D 7/00; H05K 5/0017; H05K 5/0226; G06F 1/1681; G06F 1/1652; H04M 1/022; F16M 11/10; E05Y 2900/606; Y10Y 16/541; Y10Y 16/547; Y10Y 16/5474; Y10Y 16/5475; Y10Y 16/5476; Y10T 16/541; Y10T 16/547; Y10T 61/5474; Y10T 16/5475; Y10T 16/5476
USPC .......... 16/354, 366, 368, 369, 370; 248/919; 379/433.13; 455/575.3; 361/679.27, 361/679.06
See application file for complete search history.

(56) References Cited

U.S. PATENT DOCUMENTS 6,223,393 B1 * 5/2001 Knopf .................. G06F 1/1618 16/366
8,720,011 B1 * 5/2014 Hsu ......................... E05D 3/122 16/354
8,971,032 B2 * 3/2015 Griffin .................. G06F 1/1616 345/156
9,506,279 B2 * 11/2016 Kauhaniemi ......... G06F 1/1652
9,562,380 B2 * 2/2017 Song ......................... E05D 1/00
9,606,583 B2 * 3/2017 Ahn ...................... G06F 1/1681
2014/0123436 A1 * 5/2014 Griffin ................ H04M 1/0216 16/221
2015/0277506 A1 * 10/2015 Cheah .................. G06F 1/1681 361/679.27
2016/0048174 A1 * 2/2016 Hsu ....................... G06F 1/1681 16/342
2016/0139634 A1 * 5/2016 Cho ...................... G06F 1/1652 361/679.27

(Continued)

*Primary Examiner* — William L Miller
(74) *Attorney, Agent, or Firm* — Li&Cai Intellectual Property (USA) Office

(57) ABSTRACT

A supporting device includes a hinge module and two buffering modules respectively installed on two opposite sides of the hinge module. Each buffering module includes an internal linking member fixed on the hinge module, an external linking member slidably disposed on the internal linking member, and an elastic member connected to the internal linking member and the external linking member. The hinge module is bendable between an unfolded position and an outwardly folded position. When the hinge module is at the unfolded position, the supporting device is a flat construction, and the elastic members are configured to block the external linking members to move away from the pivots. When the hinge module is at the outwardly folded position, the supporting device is a curved construction and the internal linking members are arranged at the inner side of the curved construction.

20 Claims, 12 Drawing Sheets

100
5
1
111 11 12
3 2
122
4
2
11 12
111

(56) References Cited

U.S. PATENT DOCUMENTS

| | | | | |
|---|---|---|---|---|
| 2016/0147267 | A1* | 5/2016 | Campbell | G06F 1/1681 361/679.27 |
| 2016/0202736 | A1* | 7/2016 | Huang | G06F 1/1681 16/369 |
| 2016/0370828 | A1* | 12/2016 | Hsu | G06F 1/1681 |
| 2016/0370829 | A1* | 12/2016 | Hsu | G06F 1/1681 |
| 2017/0060188 | A1* | 3/2017 | Han | G06F 1/1652 |
| 2017/0061836 | A1* | 3/2017 | Kim | G09F 9/301 |

* cited by examiner 100
1
12
121
1
4
12
5

BENDABLE DISPLAY APPARATUS AND SUPPORTING DEVICE

BACKGROUND OF THE INVENTION

1. Field of the Invention

The instant invention relates to a display apparatus; in particular, to a bendable display apparatus and a supporting device.

2. Description of Related Art

When the conventional supporting device is bent, the total length of the hinge module of the conventional supporting device is not changed, so a plate mounted on an outer surface of the conventional supporting device is deformed because the hinge module stretches the plate. That is to say, when a soft display mounted on the outer surface of the conventional supporting device is bent, the soft display is easily broken because the hinge module of the conventional supporting device stretches the soft display.

Therefore, a bendable display apparatus and a supporting device, which overcomes the above-mentioned problem, are provided.

SUMMARY OF THE INVENTION

The instant disclosure provides a bendable display apparatus and a supporting device for effectively solving the problem generated from conventional supporting devices.

The instant disclosure provides a bendable display apparatus, comprising: two supporting devices each including: a hinge module including: a plurality of pivots parallel to each other and arranged in one row; and a plurality of torsion units sleeved at the pivots, wherein two positioning portions are respectively arranged on two opposite portions of the torsion units; and two buffering modules respectively arranged at two opposite sides of the row of the pivots and respectively fixed on the two positioning portions, each of the two buffering modules including: an internal linking member fixed on the corresponding positioning portion; an external linking member slidably disposed on the internal linking member; and an elastic member connected to the internal linking member and the external linking member; wherein in each of the two supporting devices, the hinge module is bendable between an unfolded position and an outwardly folded position along at least one of the pivots, and the torsion units are configured to stop the hinge module at a desired position between the unfolded position and the outwardly folded position; when the hinge module is at the unfolded position, the supporting device is a flat construction, and the elastic members are configured to block the external linking members to move away from the pivots; when the hinge module is at the outwardly folded position, the supporting device is a curved construction and the internal linking members are arranged at the inner side of the curved construction; a carrying plate fixed on the external linking members of the two supporting devices; and a soft display mounted on the carrying plate; wherein when the two supporting devices are bent from the unfolded position toward the outwardly folded position, the carrying plate is bent to move each of the external linking members toward the pivots, and each of the elastic members is compressed to generate an elastic force by the movement of the corresponding external linking member.

The instant disclosure also provides a supporting device, comprising: a hinge module including: a plurality of pivots parallel to each other and arranged in one row; and a plurality of torsion units sleeved at the pivots, wherein two positioning portions are respectively arranged on two opposite portions of the torsion units; and two buffering modules respectively arranged at two opposite sides of the row of the pivots and respectively fixed on the two positioning portions, each of the two buffering modules including: an internal linking member fixed on the corresponding positioning portion; an external linking member slidably disposed on the internal linking member; and an elastic member connected to the internal linking member and the external linking member; wherein the hinge module is bendable between an unfolded position and an outwardly folded position along at least one of the pivots, and the torsion units are configured to stop the hinge module at a desired position between the unfolded position and the outwardly folded position; when the hinge module is at the unfolded position, the supporting device is a flat construction, and the elastic members are configured to block the external linking members to move away from the pivots; when the hinge module is at the outwardly folded position, the supporting device is a curved construction and the internal linking members are arranged at the inner side of the curved construction.

In summary, when the hinge module is bent between the unfolded position and the outwardly folded position, the hinge module does not stretch an object mounted on the supporting device (e.g., the soft display or the carrying plate) by moving the external linking members with respect to the internal linking members. Thus, when the supporting device supports the soft display, the soft display can be bent without suffering damage.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

[First Embodiment]

Please refer to FIGS. 1 through 9, which show a first embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1:
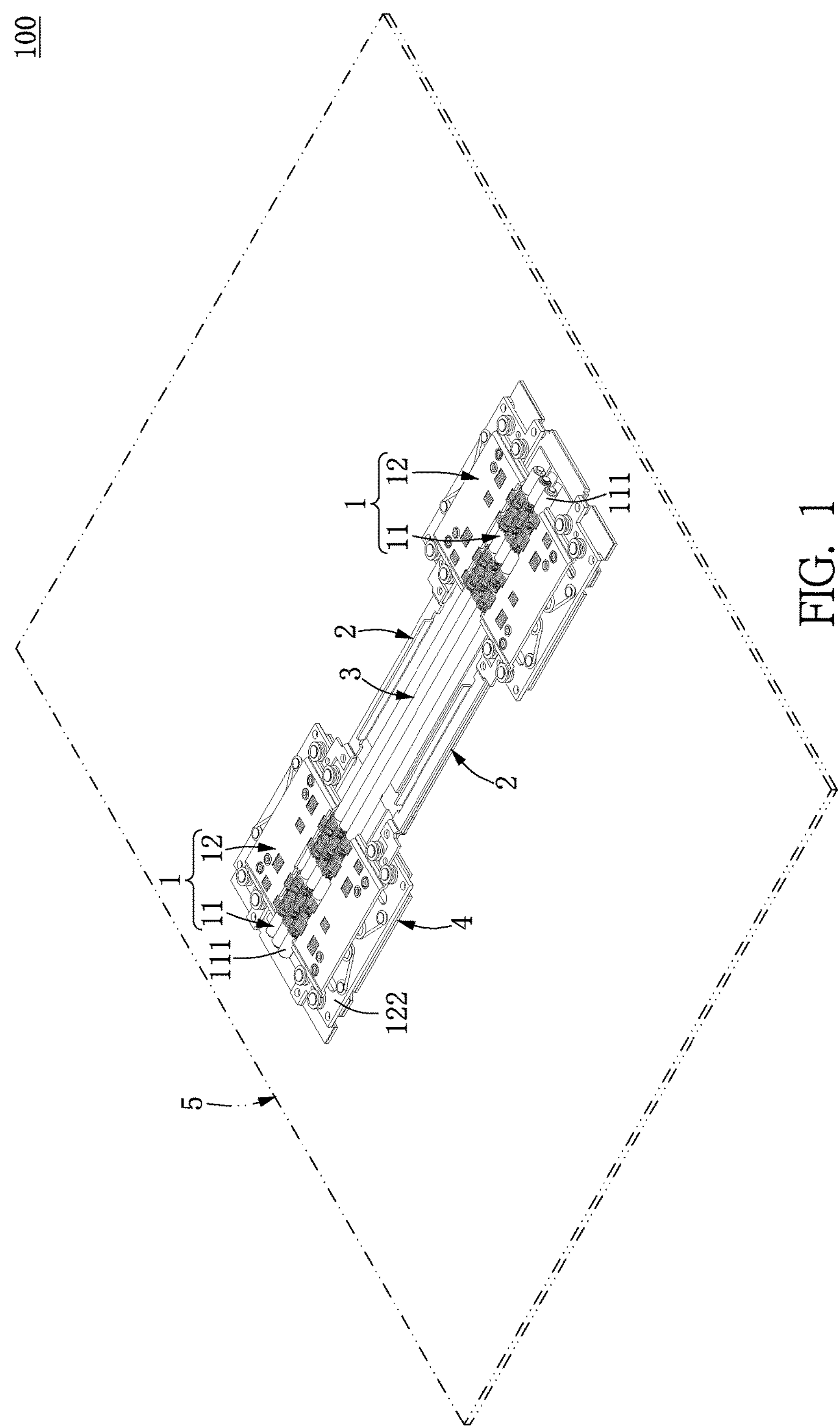
FIG. 1 is a perspective view showing a bendable display apparatus according to the instant disclosure.
Figure 2:
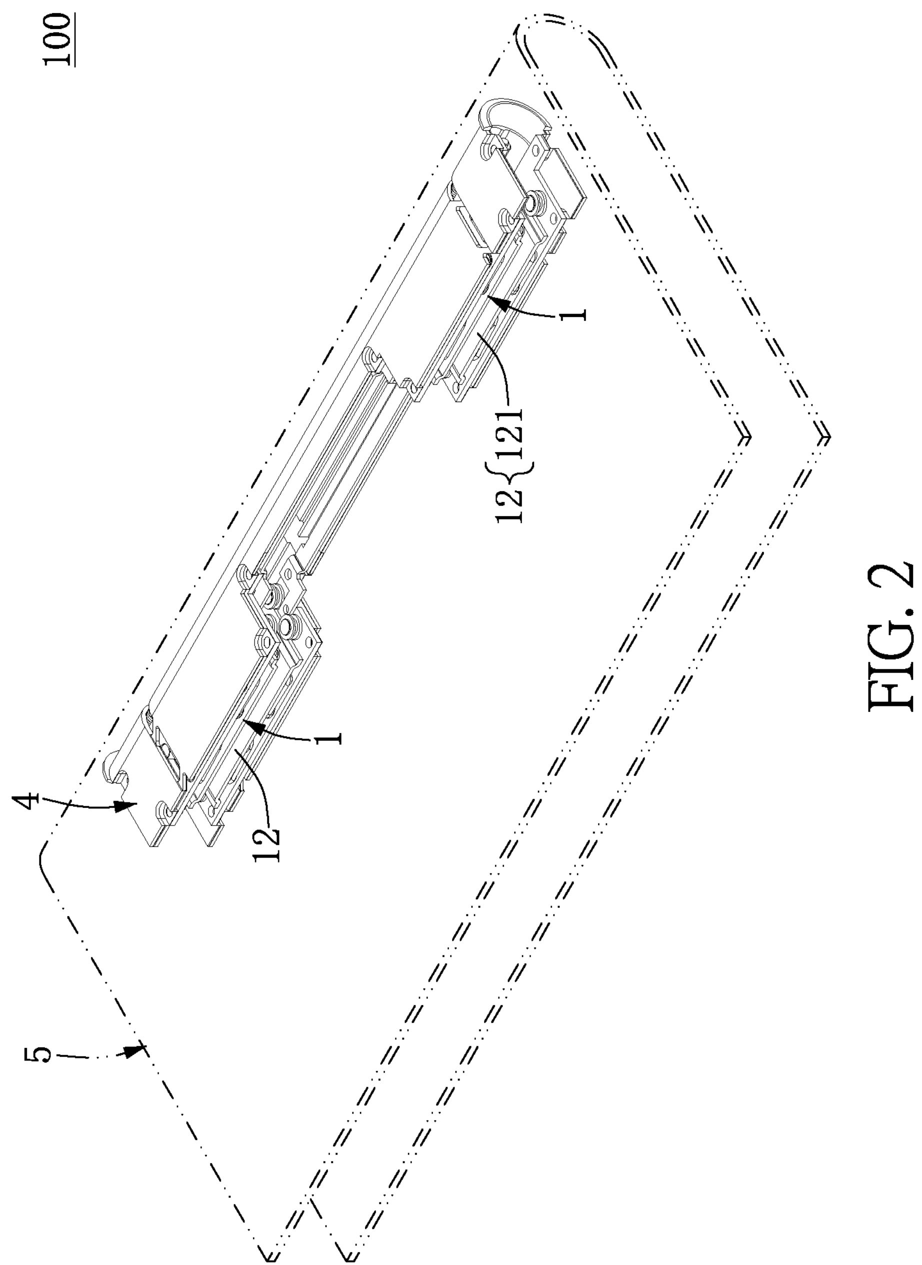
FIG. 2 is a perspective view showing the bendable display apparatus as outwardly being bent at 180 degrees.
Figure 3:
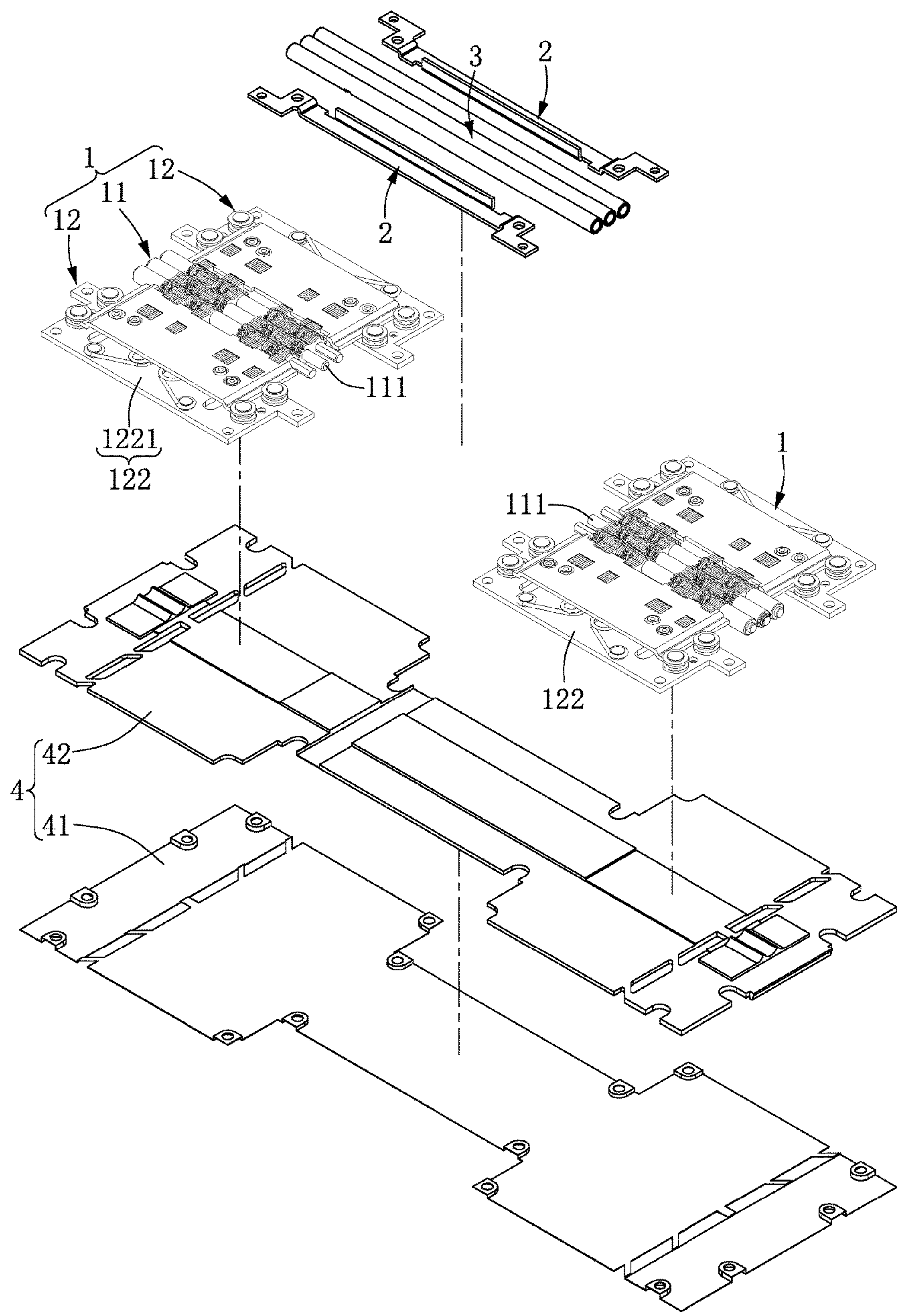
FIG. 3 is an exploded view of FIG. 1 as omitting the soft display.

Please refer to FIGS. 1 through 3, which show a bendable display apparatus 100 including two supporting devices 1, two connecting members 2, a plurality of connecting tubes 3, a carrying plate 4, and a soft display 5. The connecting members 2 and the connecting tubes 3 are configured to connect the two supporting devices 1. The carrying plate 4 is arranged on one side (i.e., the lower side shown in FIG. 1) of the supporting devices 1, the connecting members 2, and the connecting tubes 3. The soft display 5 is disposed on the carrying plate 4. A portion of the soft display 5 corresponding in position to the supporting devices 1 and the connecting tubes 3 can be outwardly bent at 180 degrees (as shown in FIG. 2) without suffering damage, but the instant disclosure is not limited thereto.

It should be noted that the movement of the bendable display apparatus 100 is a relative motion, so the figures are fixed part of the components for clearly showing the instant embodiment. Moreover, the supporting device 1 in the instant embodiment is applied to the bendable display apparatus 100, but the supporting device 1 can be applied to other apparatus.

The following description discloses the construction of each of the components of the bendable display apparatus 100, and then discloses the related features of the components of the bendable display apparatus 100. The two supporting devices 1 in the instant embodiment are substantially the identical or symmetrical constructions, so the following description only illustrates one of the two supporting devices 1.

Figure 4:
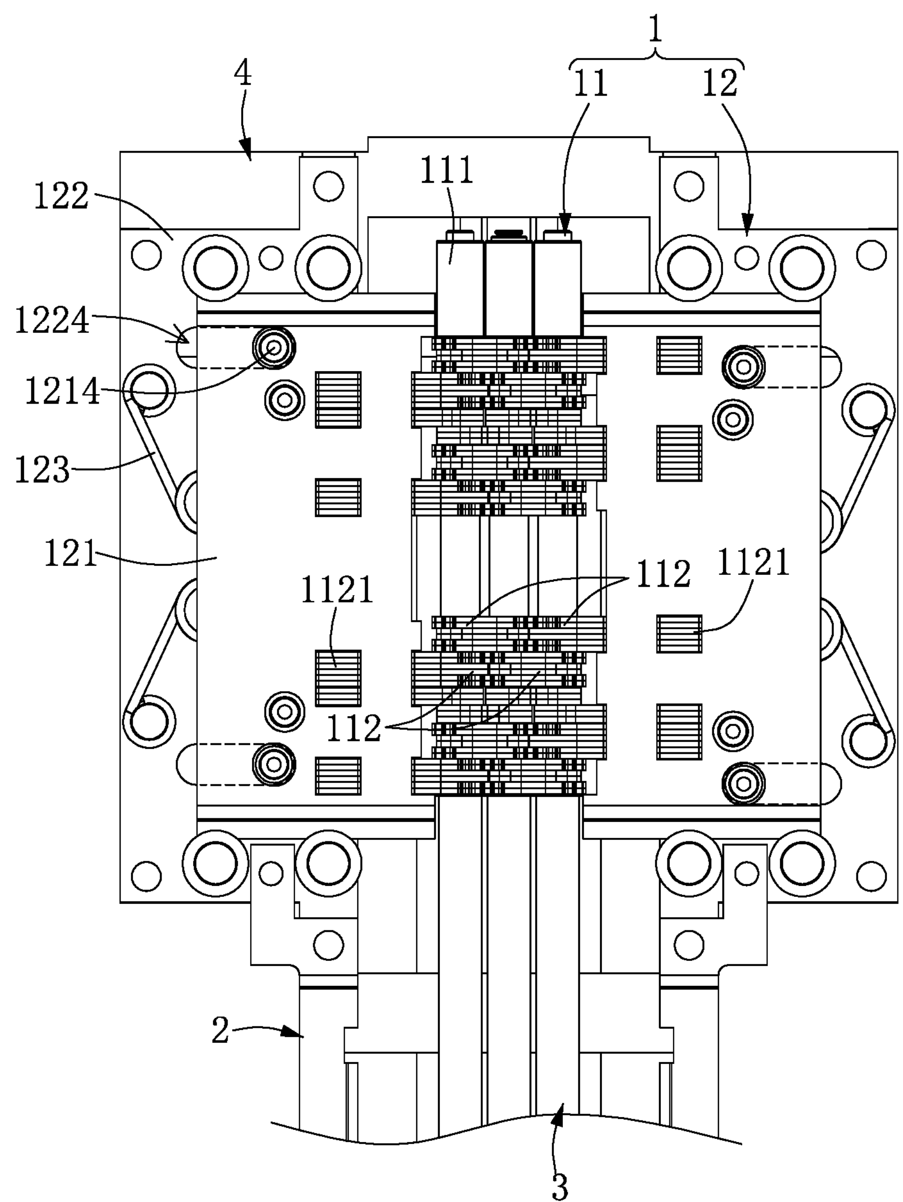
FIG. 4 is an enlarged view of FIG. 1.
Figure 5:
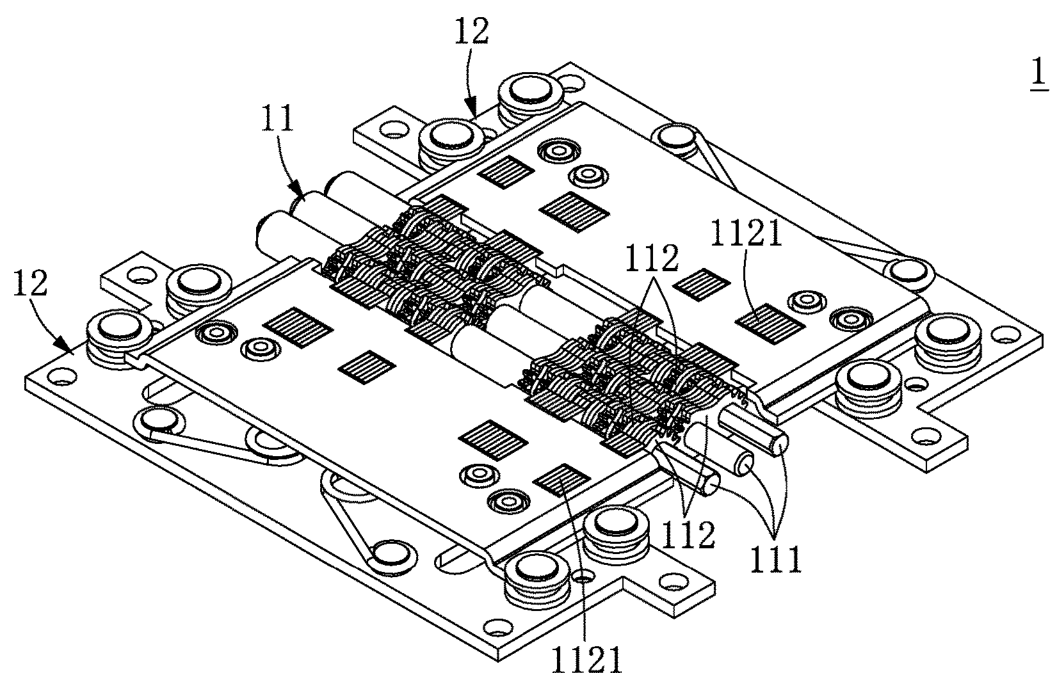
FIG. 5 is a perspective view showing a supporting device according to a first embodiment of the instant disclosure.

As shown in FIGS. 4 and 5, the supporting device 1 includes a hinge module 11 and two buffering modules 12 respectively installed on two opposite sides of the hinge module 11. The hinge module 11 includes a plurality of pivots 111 parallel to each other and arranged in one row and a plurality of torsion units 112 sleeved at the pivots 111. The pivots 111 in the instant embodiment are three rods, but the instant disclosure is not limited thereto.

The torsion unit 112 can be at least one of a gear, a plurality of stacked gear-plates, and a plurality of stacked washers. The torsion unit 112 can be sleeved at one of the pivots 111 or two of the pivots 111. In the instant embodiment, the torsion units 112 are arranged in a plurality of rows, and any two adjacent torsion units 112 arranged in the same row are engaged with each other. Moreover, two of the torsion units 112 respectively arranged in any two adjacent rows each has an elongated positioning potion 1121. In any two adjacent rows of the torsion units 112, two positioning portions 1121 are respectively arranged in two different rows and are arranged away from each other.

In any two adjacent rows of the torsion units 112, the two torsion units 112 each having the positioning potion 1121 in the instant embodiment are respectively sleeved at two of the pivots 111 respectively arranged at two ends of the row of the pivots 111, and the positioning portions 1121 are arranged at two opposite sides of the row of the pivots 111. Specifically, the torsion units 112 of the instant embodiment have eight positioning portions 1121 for respectively connecting the two buffering modules 12, but the instant disclosure is not limited thereto. Moreover, in one of any two adjacent rows of the torsion units 112, the torsion unit 112 provided without any positioning portion 1121 is sleeved at two adjacent pivots 111, in which the two adjacent pivots 111 are respectively inserted into two engaged torsion units 112 of the other row.

Thus, the hinge module 11 is bendable between an unfolded position (as shown in FIG. 1) and an outwardly folded position (as shown in FIG. 2) along at least one of the pivots 111, and the torsion units 112 are configured to stop the hinge module 11 at a desired position between the unfolded position and the outwardly folded position. When the hinge module 11 is at the unfolded position, the supporting device 1 is a flat construction. When the hinge module 11 is at the outwardly folded position, the supporting device 1 is a curved construction and the two buffering modules 12 are arranged at the inner side of the curved construction. Specifically, as shown in FIGS. 1 and 2, the outwardly folded position in the instant embodiment is defined by outwardly bending the hinge module 11 from the unfolded position at 180 degrees, but the instant disclosure is not limited thereto.

As shown in FIG. 5, the two buffering modules 12 are respectively arranged at two opposite sides of the pivots 111, and the two buffering modules 12 are respectively fixed on the positioning portions 1121 of the torsion units 112. The two buffering modules 12 in the instant embodiment are substantially the identical or symmetrical constructions, so the following description only illustrates one of the two buffering modules 12.

Figure 6:
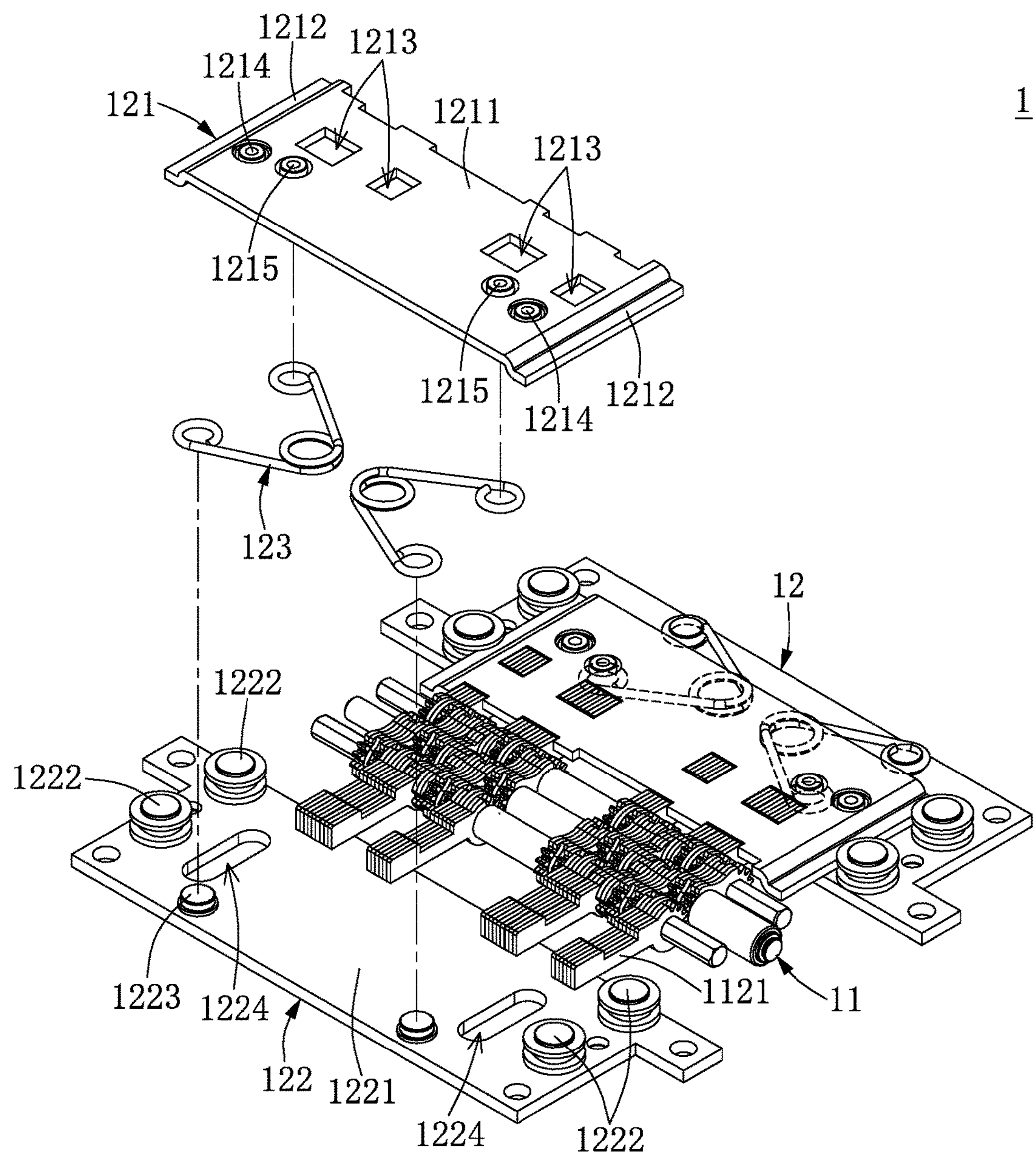
FIG. 6 is an exploded view of FIG. 5.
Figure 7:
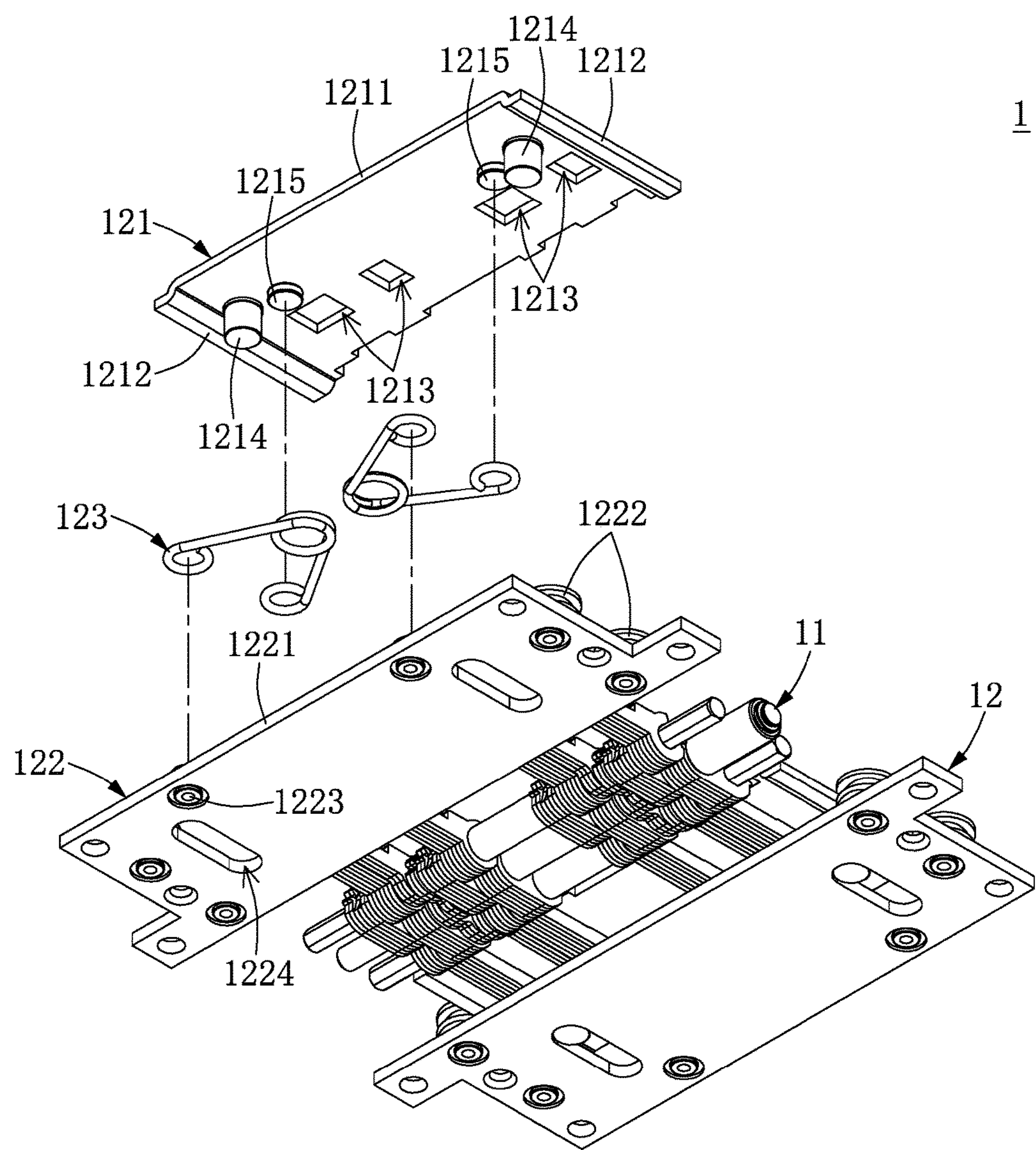
FIG. 7 is an exploded view of FIG. 5 from another perspective.

As shown in FIGS. 6 and 7, the buffering module 12 includes an internal linking member 121 fixed on the corresponding positioning portions 1121, an external linking member 122 slidably disposed on the internal linking member 121, and two elastic members 123 connected to the internal linking member 121 and the external linking member 122. The two elastic members 123 are configured to maintain a predetermined moving trace of the external linking member 122 with respect to the internal linking member 121. For example, when the hinge module 11 is at the unfolded position, the elastic members 123 are configured to block the external linking members 122 to move away from the pivots 111, thereby preventing an inwardly bending from occurring to the soft display 5 (or the carrying plate 4).

Specifically, the internal linking member 121 includes a plate 1211, two flanges 1212 curvedly extended from two opposite ends of the plate 1211 toward the carrying plate 4 (or the external linking member 122), at least one fixing portion 1213 (i.e., opening) formed on the plate 1211, at least one guiding pin 1214 fixed on the plate 1211, and two internal connecting portions 1215 fixed on the plate 1211. The number of the at least one fixing portion 1213 in the instant embodiment is equal to that of the corresponding positioning portion 1121, and the internal linking member 121 is fixed on the hinge module 11 by using the at least one fixing portion 1213 to mount on the corresponding positioning portion 1121.

The external linking member 122 includes a main plate 1221, a plurality of rollers 1222 respectively installed on two opposite portions of the main plate 1221, and two external connecting portions 1223 fixed on the main plate 1221. The main plate 1221 is fixed on the carrying plate 4, and the main plate 1221 has at least one elongated track 1224. The guiding pin 1214 of the internal linking member 121 is inserted into the track 1224, and the guiding pin 1214 and the track 1224 are movable with respect to each other. The flanges 1212 of the internal linking member 121 are respectively disposed on the rollers 1222, and the flanges 1212 and the rollers 1222 are movable with respect to each other.

In addition, the cooperation between the internal linking member 121 and the external linking member 122 in the instant embodiment adapts to the two flanges 1212 and the corresponding rollers 1222, but the instant disclosure is not limited thereto. In a non-shown embodiment, the internal linking member 121 can be provided with only one flange 1212, and the external linking member 122 can be provided with at least one roller 1222 for carrying the flange 1212.

Figure 8:
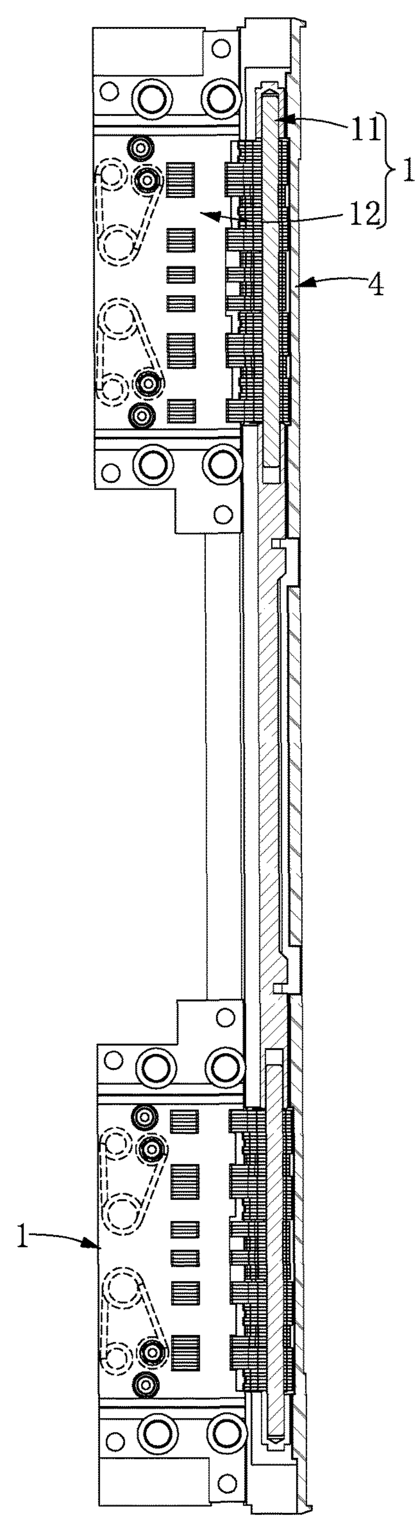
FIG. 8 is a cross-sectional view of FIG. 2 as omitting the soft display.
Figure 9:
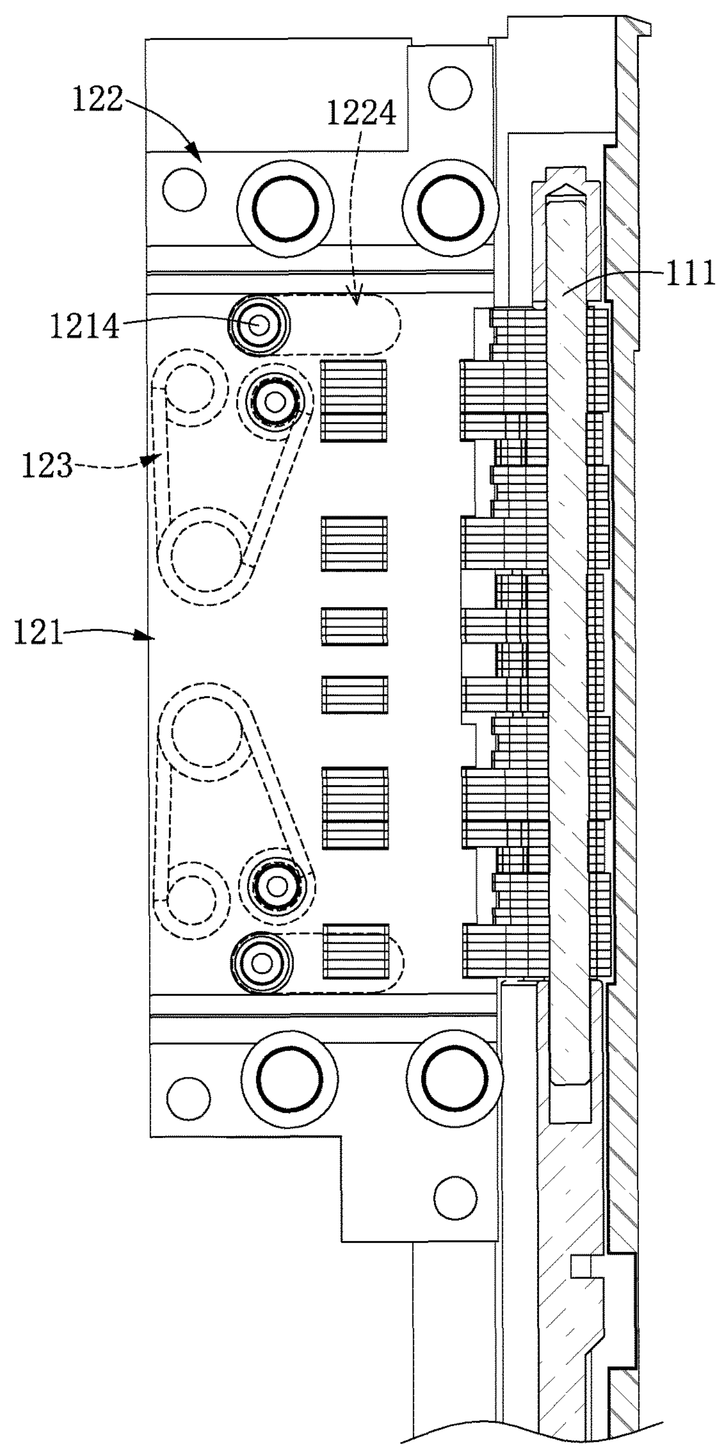
FIG. 9 is an enlarged view of FIG. 8.

Thus, when the hinge modules 11 of the two supporting devices 1 of the bendable display apparatus 100 are bent from the unfolded position (as shown in FIG. 4) toward the outwardly folded position (as shown in FIGS. 8 and 9), the carrying plate 4 (or the soft display 5) is bent to move each of the external linking members 122 toward the pivots 111 (as shown in FIGS. 4 and 9), and each of the elastic members 123 is compressed to generate an elastic force by the movement of the corresponding external linking member 122.

Specifically, as shown in FIGS. 6 and 7, each of the elastic members 123 in the instant embodiment is a torsion spring. In each of the buffering modules 12, ends of the two elastic members 123 are respectively installed on the two internal connecting portions 1215 of the internal linking member 121, and the other ends of the two elastic members 123 are respectively installed on the two external connecting portions 1223 of the external linking member 122. When each hinge module 11 is at the unfolded position (as shown in FIG. 4), each of the two elastic members 123 is uncompressed at an initial mode to maintain the relative position between the internal linking members 121 and the external linking members 122. When each hinge module 11 is at the outwardly folded position (as shown in FIG. 9), each of the elastic members 123 is compressed to store the elastic force for tending to return to the initial mode, thereby being adjusted from the outwardly folded position to the unfolded position easily.

Moreover, when the supporting device 1 is bent from the outwardly folded position (as shown in FIG. 9) to the unfolded position (as shown in FIG. 4), each guiding pin 1214 is arranged at one of two opposite ends of the corresponding track 1224 (i.e., the inner end of the track 1224 shown in FIG. 4), and each external linking member 122 cannot further move away from the outwardly folded position (i.e., the supporting device 1 cannot be inwardly bent) by the cooperation between each guiding pin 1214 and the corresponding track 1224, such that the hinge module 11 can be maintained at the unfolded position. Moreover, when the supporting device 1 is bent from the unfolded position (as shown in FIG. 4) to the outwardly folded position (as shown in FIG. 9), each guiding pin 1214 is arranged at the other end of the corresponding track 1224 (i.e., the outer end of the track 1224 shown in FIG. 9), and each external linking member 122 cannot further move away from the unfolded position (i.e., the supporting device 1 cannot be further bent) by the cooperation between each guiding pin 1214 and the corresponding track 1224, such that the hinge module 11 can be maintained at the outwardly folded position.

As shown in FIGS. 3 and 4, each connecting member 2 is an elongated sheet. Two adjacent external linking members 122 respectively arranged on the two supporting devices 1 (i.e., the upper left external linking members 122 and the lower left external linking members 122 as shown in FIG. 3) are connected by one of the two connecting members 2. Ends of the connecting tubes 3 are respectively sleeved at the pivots 111 of one of the two supporting devices 2, and the other ends of the connecting tubes 3 are respectively sleeved at the pivots 111 of the other supporting device 2. Thus, the two supporting devices 1 can be smoothly operated at the same time by using the connecting members 2 and the connecting tubes 3.

As shown in FIGS. 3 and 4, the carrying plate 4 is fixed on (the main plates 1221 of) the external linking members 122 of the two supporting devices 1. The carrying plate 4 includes a metal layer 41 and a cushion layer 42. The metal layer 41 is fixed on (the main plates 1221 of) the external linking members 122 of the two supporting devices 1, and the soft display 5 is mounted on the metal layer 41. The cushion layer 42 is disposed between the metal layer 41 and the two supporting devices 1.

In addition, the soft display 5 in the instant embodiment is fixed on the carrying plate 4, but the instant disclosure is not limited thereto. In a non-shown embodiment, the soft display 5 can be directly fixed on (the main plates 1221 of) the external linking members 122 of the two supporting devices 1.

In summary, when the hinge modules 11 of the bendable display apparatus 100 are bent between the unfolded position and the outwardly folded position, the hinge modules 11 does not stretch the soft display 5 (or the carrying plate 4) by moving the external linking members 122 with respect to the internal linking members 121. Thus, when the two supporting devices 1 support the soft display 5, the soft display 5 can be bent without suffering damage.

Moreover, when the bendable display apparatus 100 is at the unfolded position, the construction of each supporting device 1 is provided to block the hinge module 11 to move away from the outwardly folded position, thereby preventing an inwardly bending from occurring to the soft display 5 (or the carrying plate 4).

[Second Embodiment]

Figure 10:
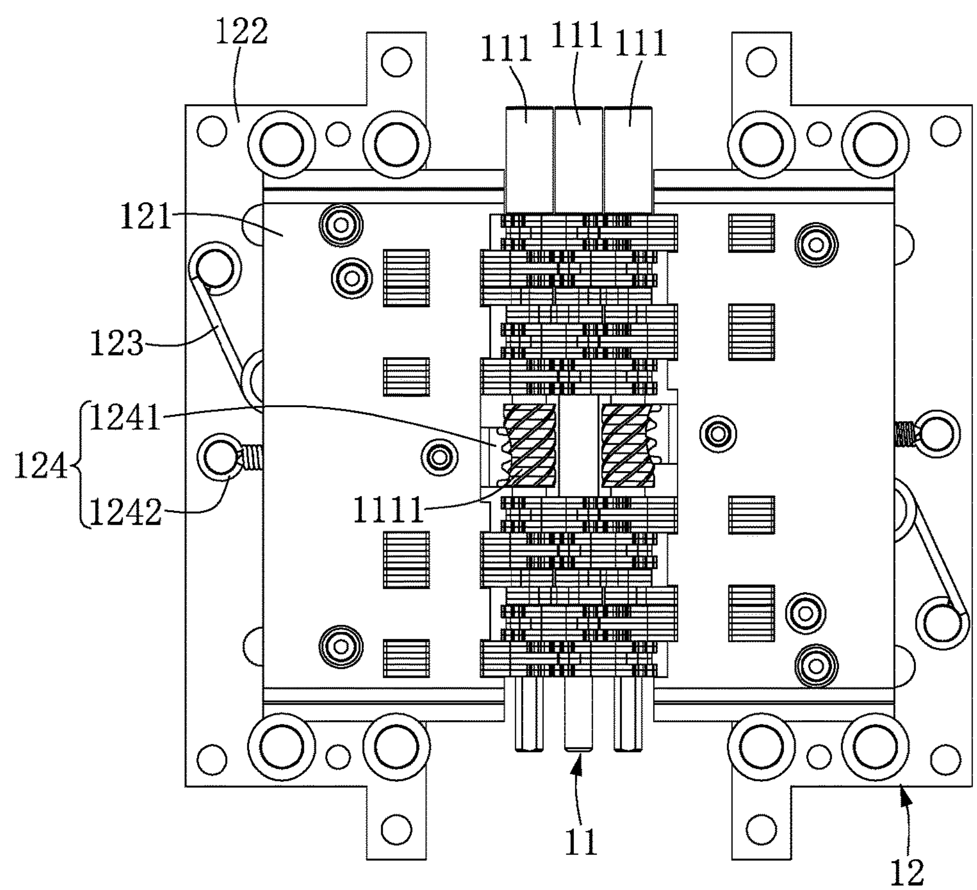
FIG. 10 is a top view showing the supporting device according to a second embodiment of the instant disclosure.
Figure 11:
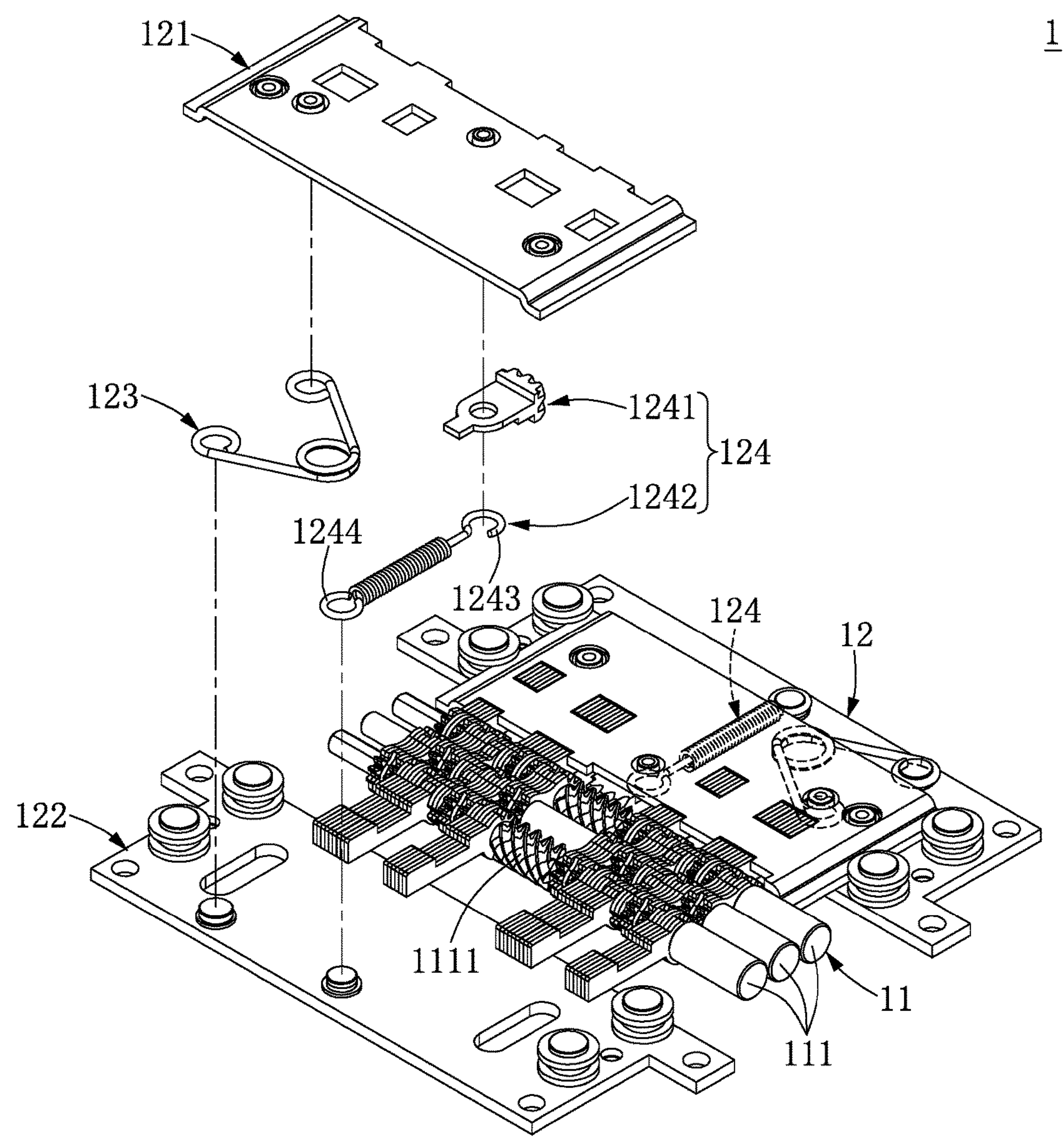
FIG. 11 is an exploded view of FIG. 10.
Figure 12:
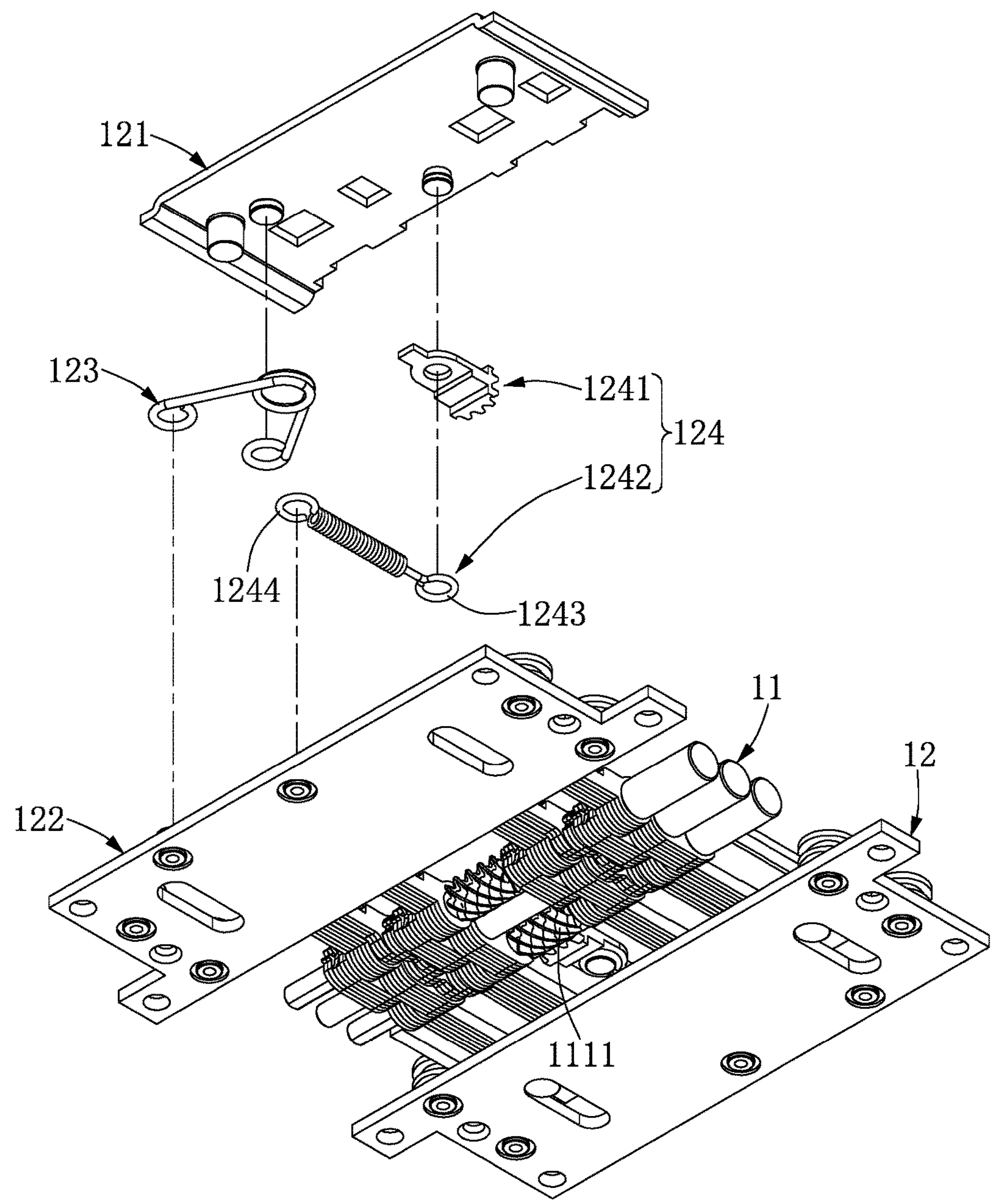
FIG. 12 is an exploded view of FIG. 10 from another perspective.

Please refer to FIGS. 10 through 12, which show a second embodiment. The second embodiment is similar to the first embodiment, and the identical features are not disclosed. The different feature between the two embodiments is the supporting device 1.

In each buffering module 12 of the instant embodiment, the number of the elastic member 123 is one, the buffering module 12 further includes a locking unit 124 connected to the internal linking member 121 and the external linking member 122, and the locking unit 124 is driven by the adjacent pivot 111. Moreover, two of the pivots 111 respectively arranged at two ends of the row of the pivots 111 each has a gearing portion 1111, and each of the gearing portions 1111 in the instant embodiment is a helical gear, but the instant disclosure is not limited thereto.

Specifically, the locking unit 124 includes a connecting shaft 1241 and a limiting member 1242. The connecting shaft 1241 is pivotally connected to the internal linking member 121 and is driven by the gearing portion 1111 of the adjacent pivot 111. In other words, an end of the connecting shaft 1241 engages the gearing portion 1111 of the adjacent pivot 111, such that the gearing portion 1111 can rotate the connecting shaft 1241 with respect to the internal linking member 121. The limiting member 1242 in the instant embodiment is a tension spring, and the limiting member 1242 has a first end 1243 and an opposite second end 1244. The first end 1243 and the second end 1244 of the limiting member 1242 are respectively connected to the connecting shaft 1241 and the external linking member 122.

Thus, when the hinge module 11 is bent from the unfolded position (as shown in FIGS. 9 and 10) to the outwardly folded position (not shown), the external linking member 122 moves the second end 1244 of the limiting member 1242 toward the connecting shaft 1241, so the limiting member 1242 becomes a curved construction. But, the curved limiting member 1242 does not have enough force to influence the movement of the external linking member 122 and the rotation of the connecting shaft 1241.

However, if the hinge module 11, which is at the unfolded position, is bent away from the outwardly folded position (e.g., the soft display 5 is inwardly bent), each external linking member 122 moves away from the pivots 111 to stretch the corresponding limiting member 1242, so the limiting member 1242 in each buffering module 12 is stretched to generate an elastic force for blocking the rotation of the connecting shaft 1241 and the operation of the gearing portion 1111 of the pivot 111, thereby the elastic force of each limiting member 1242 conversely blocking the external linking member 122 to move away from the pivots 111. In other words, when the hinge module 11, which is at the unfolded position, is bent away from the outwardly folded position, the locking units 124 are configured to lock the operation of the external linking members 122 and the operation of the gearing portions 1111. Thus, when the hinge module 11 is at the unfolded position, each locking unit 124 is configured to block the adjacent pivot 111 to move away from the outwardly folded position.

Thus, the locking units 124 and the corresponding components are configured to maintain a predetermined moving trace of the external linking members 122 with respect to the internal linking members 121. For example, when the hinge module 11 is at the unfolded position, each locking unit 124 is configured to block the adjacent pivot 111 to move away from the outwardly folded position, thereby preventing an inwardly bending from occurring to the soft display 5 (or the carrying plate 4).

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A bendable display apparatus, comprising:

two supporting devices each including:

a hinge module including:

a plurality of pivots parallel to each other and arranged in one row; and a plurality of torsion units sleeved at the pivots, wherein two positioning portions are respectively arranged on two opposite portions of the torsion units; and two buffering modules respectively arranged at two opposite sides of the row of the pivots and respectively fixed on the two positioning portions, each of the two buffering modules including:

an internal linking member fixed on the corresponding positioning portion;

an external linking member slidably disposed on the internal linking member; and an elastic member connected to the internal linking member and the external linking member;

wherein in each of the two supporting devices, the hinge module is bendable between an unfolded position and an outwardly folded position along at least one of the pivots, and the torsion units stopping the hinge module at a desired position between the unfolded position and the outwardly folded position; when the hinge module is at the unfolded position, the supporting device is a flat construction, and the elastic members block the external linking members to move away from the pivots; when the hinge module is at the outwardly folded position, the supporting device is a curved construction and the internal linking members are arranged at the inner side of the curved construction;

a carrying plate fixed on the external linking members of the two supporting devices; and a soft display mounted on the carrying plate;

wherein when the two supporting devices are bent from the unfolded position toward the outwardly folded position, the carrying plate is bent to move each of the external linking members toward the pivots, and each of the elastic members is compressed to generate an elastic force by the movement of the corresponding external linking member.

2. The bendable display apparatus as claimed in claim 1, wherein in each of the buffering modules, the external linking member includes a track, the internal linking member includes a guiding pin inserted into the track, and the guiding pin and the track are movable with respect to each other.

3. The bendable display apparatus as claimed in claim 1, wherein in each of the buffering modules, the external linking member includes a roller, the internal linking member includes a flange disposed on the roller, and the flange and the roller are movable with respect to each other.

4. The bendable display apparatus as claimed in claim 1, further comprising at least one connecting member, wherein two adjacent external linking members respectively arranged on the two supporting devices are connected by the at least one connecting member.

5. The bendable display apparatus as claimed in claim 1, wherein the carrying plate includes a metal layer and a cushion layer, the metal layer is fixed on the external linking members of the two supporting devices, the soft display is mounted on the metal layer, and the cushion layer is disposed between the metal layer and the two supporting devices.

6. The bendable display apparatus as claimed in claim 1, wherein each of the buffering modules includes a locking unit connected to the internal linking member and the external linking member, the locking unit of each of the buffering modules is driven by the adjacent pivot; when the hinge module of each of the two supporting devices is at the unfolded position, the locking unit blocks the adjacent pivot to move away from the outwardly folded position.

7. The bendable display apparatus as claimed in claim 6, wherein in each of the two supporting devices, two of the pivots respectively arranged at two ends of the row of the pivots each has a gearing portion; in each of the buffering modules, the locking unit includes a connecting shaft and a limiting member, the connecting shaft is pivotally connected to the internal linking member and is driven by the gearing portion of the adjacent pivot, two opposite ends of the limiting member are respectively connected to the connecting shaft and the external linking member.

8. The bendable display apparatus as claimed in claim 7, wherein each of the gearing portions is a helical gear, an end of the connecting shaft of each of the buffering modules engages the gearing portion of the adjacent pivot, and the limiting member of each of the buffering modules is a tension spring.

9. The bendable display apparatus as claimed in claim 1, wherein in each of the two supporting devices, the two positioning portions are arranged at two opposite sides of the pivots, and two of the torsion units having the two positioning portions are respectively sleeved at two of the pivots respectively arranged at two ends of the row of the pivots.

10. The bendable display apparatus as claimed in claim 9, wherein in each of the two supporting devices, the torsion units are arranged in a plurality of rows, any two adjacent torsion units arranged in the same row are engaged with each other, and two of the torsion units having the two positioning portions are respectively arranged in two different rows.

11. The bendable display apparatus as claimed in claim 1, wherein in each of the two supporting devices, the outwardly folded position is defined by outwardly bending the hinge module from the unfolded position at 180 degrees.

12. The bendable display apparatus as claimed in claim 1, wherein in each of the two supporting devices, the internal linking member of each of the two buffering modules has at least one opening, and the two positioning portions of the hinge module are respectively inserted into the openings of the internal linking members of the two buffering modules.

13. The bendable display apparatus as claimed in claim 1, wherein in each of the two supporting devices, the elastic member is a torsion spring, two opposite ends of the elastic member are mounted on the internal linking member and the external linking member; when the hinge module is at the unfolded position, the elastic members are uncompressed at an initial mode to maintain the relative position between the internal linking members and the external linking members; when the hinge module is at the outwardly folded position, each of the elastic members is compressed to store the elastic force for tending to return to the initial mode.

14. A supporting device, comprising:

a hinge module including:

a plurality of pivots parallel to each other and arranged in one row; and a plurality of torsion units sleeved at the pivots, wherein two positioning portions are respectively arranged on two opposite portions of the torsion units; and two buffering modules respectively arranged at two opposite sides of the row of the pivots and respectively fixed on the two positioning portions, each of the two buffering modules including:

an internal linking member fixed on the corresponding positioning portion;

an external linking member slidably disposed on the internal linking member; and an elastic member connected to the internal linking member and the external linking member;

wherein the hinge module is bendable between an unfolded position and an outwardly folded position along at least one of the pivots, and the torsion units stopping the hinge module at a desired position between the unfolded position and the outwardly folded position; when the hinge module is at the unfolded position, the supporting device is a flat construction, and the elastic members block the external linking members to move away from the pivots; when the hinge module is at the outwardly folded position, the supporting device is a curved construction and the internal linking members are arranged at the inner side of the curved construction.

15. The supporting device as claimed in claim 14, wherein each of the buffering modules includes a locking unit connected to the internal linking member and the external linking member, the locking unit of each of the buffering modules is driven by the adjacent pivot; when the hinge module of each of the two supporting devices is at the unfolded position, the locking unit blocks the adjacent pivot to move away from the outwardly folded position.

16. The supporting device as claimed in claim 15, wherein two of the pivots respectively arranged at two ends of the row of the pivots each has a gearing portion; in each of the buffering modules, the locking unit includes a connecting shaft and a limiting member, the connecting shaft is pivotally connected to the internal linking member and is driven by the gearing portion of the adjacent pivot, two opposite ends of the limiting member are respectively connected to the connecting shaft and the external linking member.

17. The supporting device as claimed in claim 16, wherein each of the gearing portions is a helical gear, an end of the connecting shaft of each of the buffering modules engages the gearing portion of the adjacent pivot, and the limiting member of each of the buffering modules is a tension spring.

18. The supporting device as claimed in claim 14, wherein the outwardly folded position is defined by outwardly bending the hinge module from the unfolded position at 180 degrees.

19. The supporting device as claimed in claim 14, wherein the internal linking member of each of the two buffering modules has at least one opening, and the two positioning portions of the hinge module are respectively inserted into the openings of the internal linking members of the two buffering modules.

20. The supporting device as claimed in claim 14, wherein the elastic member is a torsion spring, two opposite ends of the elastic member are mounted on the internal linking member and the external linking member; when the hinge module is at the unfolded position, the elastic members are uncompressed at an initial mode to maintain the relative position between the internal linking members and the external linking members; when the hinge module is at the outwardly folded position, each of the elastic members is compressed to store an elastic force for tending to return to the initial mode.

* * * * *